US006888824B1

(12) United States Patent
Fang et al.

(10) Patent No.: US 6,888,824 B1
(45) Date of Patent: May 3, 2005

(54) RANDOM EARLY DETECTION (RED) ALGORITHM USING MARKED SEGMENTS TO DETECT CONGESTION IN A COMPUTER NETWORK

(75) Inventors: Chien Fang, Danville, CA (US); Hiroshi Suzuki, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 731 days.

(21) Appl. No.: 09/693,419

(22) Filed: Oct. 20, 2000

(51) Int. Cl.[7] ............................. H04L 12/54; H04J 3/14
(52) U.S. Cl. ...................................... 370/359; 370/419
(58) Field of Search ................................. 370/356, 359, 370/363, 368, 386, 389, 392, 412, 418–419, 422, 429, 465–466, 229–235; 709/230

(56) References Cited

U.S. PATENT DOCUMENTS

| | | | |
|---|---|---|---|
| 5,687,176 A | * 11/1997 | Wisniewski et al. ........ | 370/476 |
| 6,333,917 B1 | * 12/2001 | Lyon et al. ................. | 370/236 |
| 2003/0030866 A1 | * 2/2003 | Yoo ............................ | 359/128 |
| 2003/0048792 A1 | * 3/2003 | Xu et al. .................... | 370/400 |

OTHER PUBLICATIONS

Sally Floyd and Van Jacobson Random Early Detection Gateways for Congestion Avoidance Sep., 1993, pp. 1–22.
V. Jacobson, K.Nichols, and K. Poduri Cisco Systems RED in a Different Light Sep. 30, 1999, pp. 1–38.
Van Jacobson Notes on using RED for Queue Management and Congestion Avoidance Jun. 8, 1998.

* cited by examiner

*Primary Examiner*—John Pezzlo
*Assistant Examiner*—Saba Tsegaye
(74) *Attorney, Agent, or Firm*—Cesari and McKenna, LLP

(57) ABSTRACT

The invention is to use the ability of a switching fabric to set a congestion indicator bit in a segment if any queue through which the segment passes is filled above a lower threshold. The output linecard monitors the field of the congestion indicator bit as it receives segments from the switching fabric. The output linecard periodically calculates the ratio of segments having the congestion bit set to all segments routed to a particular port. The periodically calculated ratio is used as an input parameter to a Random Early Detection (RED) algorithm. The RED algorithm selects a packet for the output linecard to drop, by use of a random selection method. The destination computer then does not receive the packet. The random selection of packets to drop has the effect of helping to prevent undesirable network synchronization of transmission of replacement packets. With adaptive source computers, the network device then does not reach a congested state, thereby maintaining optimum throughput for the computer network. When an ATM switching fabric is used with ATM cells for the segments, then the Explicit Forward Congestion Indication Field (EFCI bit) of a data cell is used to mark a data cell which has passed through a queue which is filled above a lower threshold level. Data cells arriving at the output line card with the EFCI bit set are then counted, and this count is used in the periodic calculation of the ratio used as input to the RED algorithm.

21 Claims, 13 Drawing Sheets

SWITCH FABRIC WITH LINECARDS, QUEUES AND THRESHOLDS

LINECARD WITH MICRO-PROCESSOR FOR EXECUTING RED ALGORITHM, RAM MEMORY FOR STORING CODE AND DATA

ATM CELL STRUCTURE

ATM CELL HEADER

TOPOLOGY FOR RED SIMULATIONS

RESULTS FOR EPD-THRESHOLD = 300, 900

RESULTS FOR EFCI-THRESHOLD = 100,
EPD = 300

RESULTS FOR EFCI-THRESHOLD = 300,
EPD = 900

RESULTS FOR PD UPDATE INTERVAL = 200 msec

PER-CLASS VS. PER-CLASS PER-PREFERENCE Ne/Nt

RANDOM EARLY DETECTION (RED) ALGORITHM USING MARKED SEGMENTS TO DETECT CONGESTION IN A COMPUTER NETWORK

BACKGROUND OF THE INVENTION

1. Field of the Invention

This invention relates to congestion within a computer network, and more particularly to avoidance of congestion.

2. Background Information

Modern network devices, layer 3 routers, layer 2 switches, etc., are designed with linecards interfacing to the computer network, and with a switching fabric interconnecting the linecards inside the network device. As packets arrive at the linecards, typically IP packets, from the computer network, they are converted into fixed length packets referred to as "segments" and forwarded to the switching fabric. A frequently used fixed length packet is the Asynchronous Transfer Mode (ATM) cell, and the switching fabric then used is an ATM based switching fabric. Also, various vendors use other segment types, for example a 64 byte, or a 128 byte, or a 256 byte, etc., segment are sometimes employed. The design of a segment, or cell, switching fabric is described in the Stanford University project "Tiny-Tera" in documents found at the website: http://klamath.stanford.edu/tiny-tera.

The switching fabric routes the segments to the proper output linecard. The output linecard converts the sequence of segments into the proper format packet to transmit onto the output computer network connected to the output linecard, and transmits the packet onto the output computer network.

The switching fabric has queues internal to its structure. As these queues fill up from heavy traffic loads on the network device, segments can be dropped by the switching fabric. The output linecard then receives a defective packet, and does not transmit the defective packet. The switching fabric does not "see" packets, it only handles segments. Thus it becomes the job of the output linecard to drop a defective packet.

When a packet is dropped, the destination computer does not receive the packet, and consequently does not transmit an Acknowledgement (ACK) message to the source computer. A timer in the source computer (retransmit timer) which is waiting for receipt of the ACK message times out, causing the source station to transmit a replacement packet. The replacement packet contributes to the already congested situation within the switching fabric. A source computer implementing TCP/IP, or some other adaptable protocol, reduces the rate at which it transmits packets in response to its retransmit timer timing out. As segments are lost within the congested switching fabric (and consequently packets headed toward the destination computer are lost), a source computer using an adaptable protocol such as TCP transmits at slower and slower transmission rates. Slow transmission rates may underutilize links of the network, resulting in wasted bandwidth in the network.

As filled queues within the switch fabric overflow and segments are dropped, many packets from many different source stations may be dropped. These source stations will then transmit their replacement packets at nearly the same time, thereby creating undesirable network synchronization. The replacement packets will then all reach the network device at about the same time, and contribute even more to congestion within the network device.

An algorithm, referred to as the Random Early Detection (RED) algorithm uses direct measurement of queue length to randomly drop a computer network packet, is described by S. Floyd and V. Jacobson in the paper "Random Early Detection Gateways for Congestion Avoidance", published in IEEE/ACM Transactions on Networking, V. 1, N4, p. 397–412, in August 1993, all disclosures of which are incorporated herein by reference. Also, further features of the RED algorithm are described in the paper by V. Jacobson, K. Nichols, K. Poduri, titled "RED in A New Light", unpublished but widely circulated, all disclosures of which are incorporated herein by reference. However, when a switching fabric implemented in a commercial set of computer chips is used in a network device, there is no way to access queue lengths by the designer of the network device and so no way to implement the RED algorithm.

There is needed a method for detecting the fact that incipient congestion is building within a switching fabric of a network device, where access to queue length is not available to the designer of the network device, and to respond to the incipient congestion by dropping a packet before congestion becomes severe.

SUMMARY OF THE INVENTION

The invention is to use the ability of a switching fabric to set a congestion indicator bit in a segment if any queue through which the segment passes is filled above a lower threshold. The lower threshold is set, for example, as part of the boot-up sequence of the network device. The output linecard monitors the field of the congestion indicator bit as it receives segments from the switching fabric. The output linecard periodically calculates the ratio of segments having the congestion bit set to all segments routed to a particular port. The periodically calculated ratio is used as an input parameter to a Random Early Detection (RED) algorithm. The RED algorithm selects a packet for the output linecard to drop, by use of a random selection method. The destination computer then does not receive the packet since the output linecard does not transmit a dropped packet. In an adaptable protocol such as TCP/IP, the source station resends the packet in response to its timer timing out as it waits for an ACK message, and also the source computer reduces the rate at which it transmits packets into the network. The random selection of segments to drop has the effect of helping to prevent undesirable network synchronization of transmission of replacement packets. The lower threshold is set to a low value, for example at 10% to 50% of the capacity of the queue, so that the buffers remain about 50% or more empty. This choice for the lower threshold permits the buffers to absorb a burst of segments resulting from a burst of packets reaching the network device. With adaptive source computers, the network device then does not reach a congested state, thereby maintaining optimum throughput for the computer network.

When an ATM switching fabric is used with ATM cells for the segments, then the Explicit Forward Congestion Indication Field (EFCI bit) of a data cell is used to mark a cell which has passed through a queue which is filled above a lower threshold level.

Cells arriving at the output line card with the EFCI bit set are then counted, and this count is used in the periodic calculation of the ratio used as input to the RED algorithm.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION OF AN ILLUSTRATIVE EMBODIMENT

Figure 1:
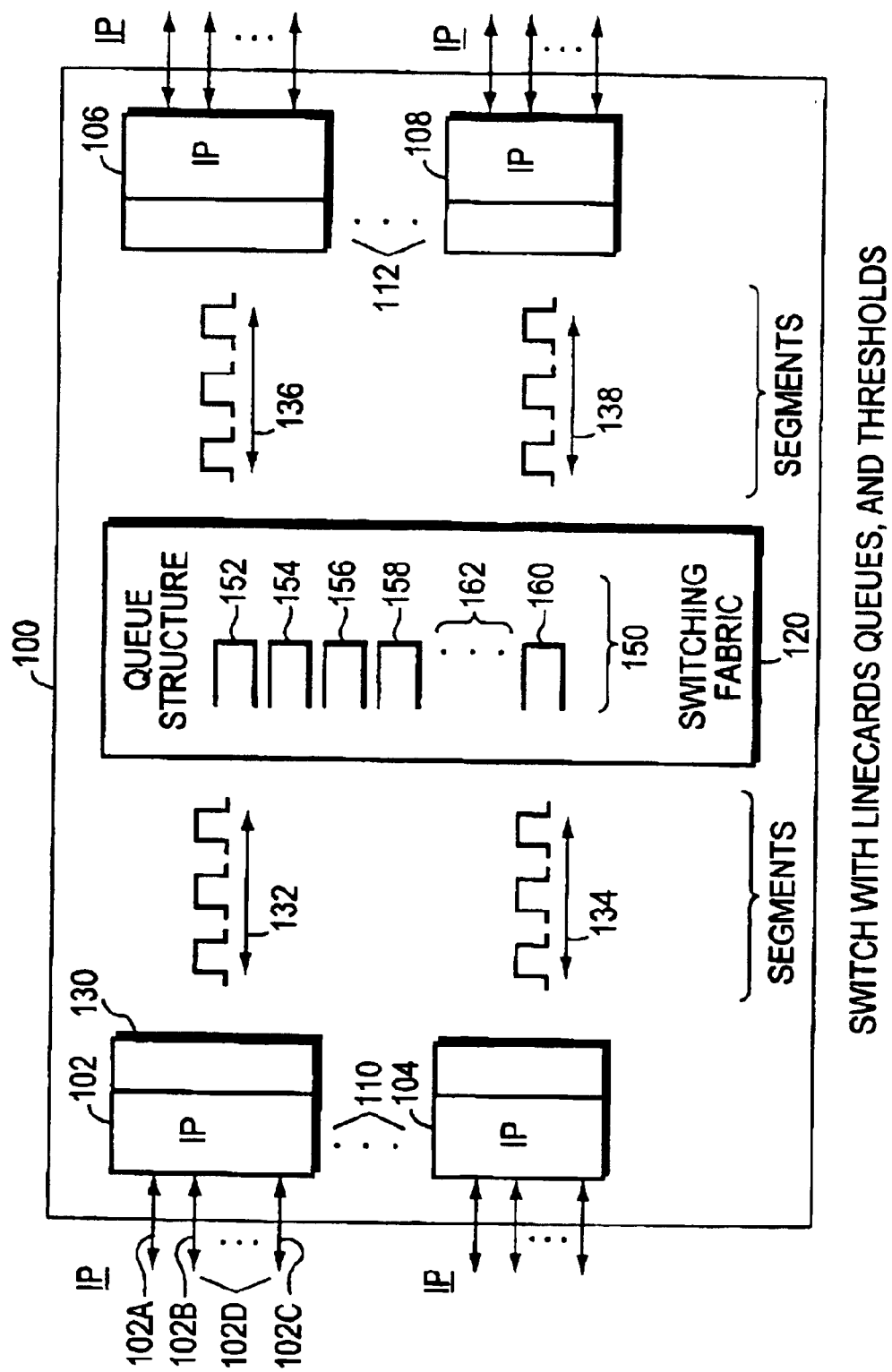
FIG. 1 is a block diagram of a network device in accordance with the invention.
Figure 2:
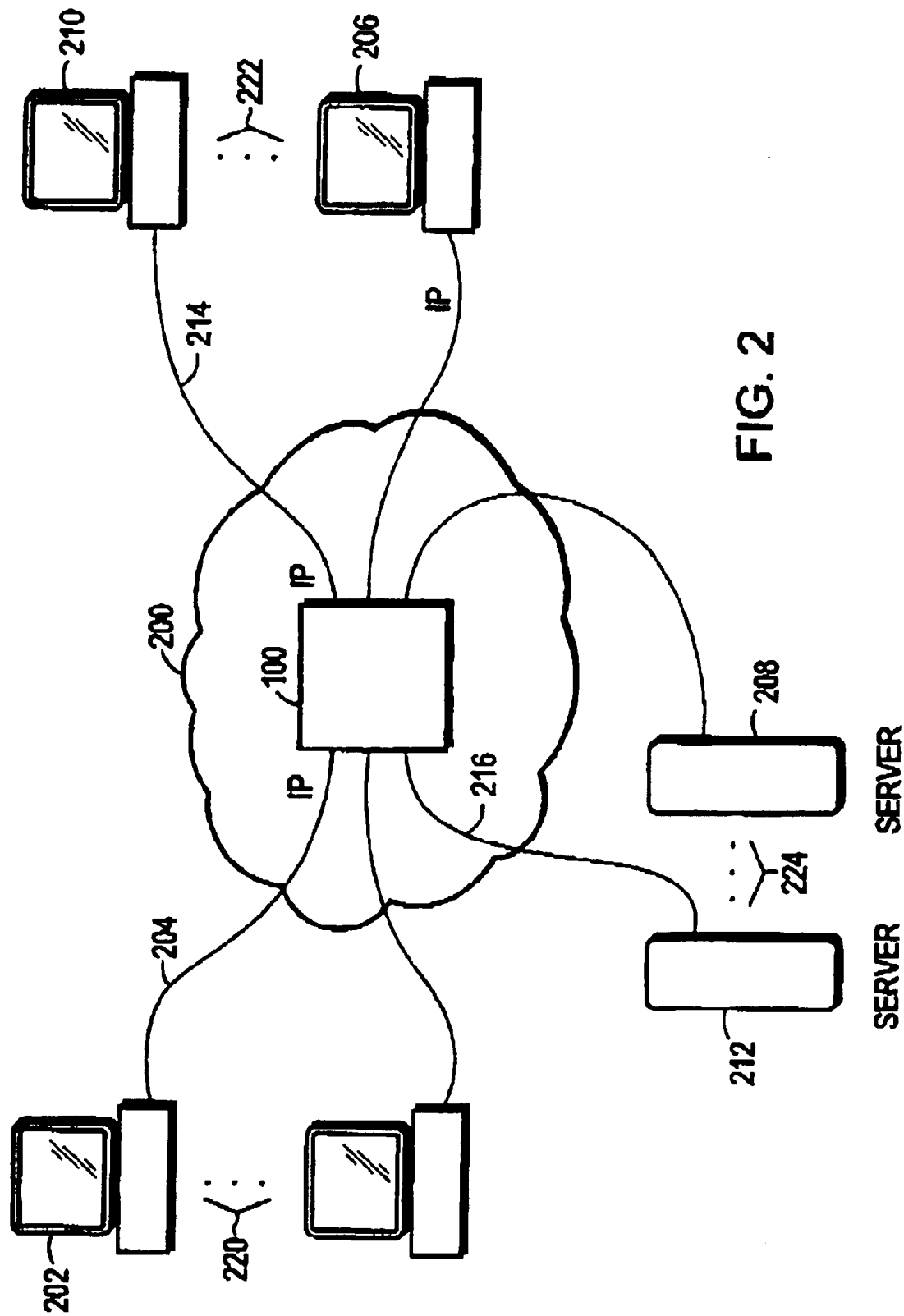
FIG. 2 is a block diagram of a computer network.

Turning now to FIG. 1, Network Device 100 is shown. The position of Network Device 100 within computer network 200 is shown in FIG. 2. For example, source station 202 transmits packets along link 204 to network device 100. Network device 100 then determines the proper output port for transmitting the packets so that they reach the proper destination computer, for example computer 206. For example, source station 202 and destination station 206 may exchange packets in a session utilizing the TCP/IP protocol. Alternatively, source station 202 may set up a communications session using a network protocol, for example, TCP/IP, with server 208. Alternatively, station 210 may set up a communication session with server 212, where the network device 100 receives packets from source station 210 along link 214, and then transmits them out through a port onto a link 216 so that the packets reach server 212.

There may be a large number of computers in network 200, as represented by three dots 220, and also as represented by three dots 222. Also there may be a large number of servers in computer network 200 as is represented by the three dots 224. Network device 100 provides a switching point within network 200 so that packets originating from a source computer may be switched so that they reach the desired destination computer. Also, a packet transmitted by a server computer, acting as a source computer, may be switched by network device 100 so that the packet reaches a desired destination computer. For example, server 212 may transmit a packet onto link 216 which is received by network device 100 through link 216. The packet may then be switched by network device 100 to link 214 so that it reaches, for example, destination computer 210. Computer network 200 is shown schematically as having only one network device 100. A computer network, such as the world wide Internet, may have thousands of network devices 100, and may have a large number of links interconnecting these various network devices. In any event, network device 100 as shown in FIG. 1 is representative of a network device utilized in the world wide Internet.

Returning to a description of network device 100 as shown in FIG. 1, network device 100 is made up of linecards 102, 104,, 106, 108, etc., and switching fabric 120. For example, linecard 102 supports ports 102A, 102B, 102C, and may support a large number of ports as is indicated by three dots 102D. The ports of linecard 102 are connected to links of a computer network. The links of the computer network may be supporting a variety of network protocols. For example, the protocols supported include the Internet protocol IP, various protocols such as IPX, Appletalk, etc.

Network device 100 may support a large number of linecards, for example, linecard 102, linecard 104, linecard 106, linecard 108, etc. For example, three dots 110 indicate a large number of linecards supporting various protocols in the computer network. Also, three dots 112 represent a further large number of linecards supporting various protocols in the computer network.

Internal to the network device 100, and interconnecting the linecards, is a switching fabric 120. Each linecard, for example, linecards 102, 104, 106, 108, and the plurality of linecards represented by three dots 110 and 112, each support a variety of protocols in the external computer network 200. Each of these linecards converts a packet in any supported protocol into segments and sends these segments to switching fabric 120. That a linecard converts an incoming packet, such as a TCP/IP packet, into segments is shown, for example, by the section 130 of linecard 102, and the sequence of segments represented by segments 132. Further, linecard 104 exchanges segments 134 with switching fabric 120. Also, linecard 106 exchanges segments 136 with switching fabric 120. Further, linecard 108 exchanges segments 138 with switching fabric 120. That is, packets received from the computer network are converted by linecards into segments, and the segments are forwarded to the switching fabric 120.

Switching fabric 120 is used to route the segments received from any receiving linecard to the appropriate output linecard. The output linecard then converts the received segments from switching fabric 120 into the appropriate format for transmission onto its outgoing link. For example, the incoming link could be an Ethernet network, and the outgoing link could be an IBM token ring network, etc. Alternatively, either of the links, the incoming link or the outgoing link, could be a Fiber Distributed Data Interface (FDDI) Network. Hence, translation of the incoming computer network packet into segments, and then translation of the segments into the proper format for the outgoing link, permits ease of matching of the various types of computer protocols utilized in computer networks, for example, when computer network 200 represents the world wide Internet.

Switching fabric 120 is, for example, constructed of a few computer chips mounted on a computer card which is mounted within network device 100. The switching fabric 120 utilizes a plurality of queue structures. These queue structures are stored within memory of the switching fabric 120. Ordinarily, a designer of a network device 100 does not have access to the queues within the switching fabric 120. The designer of network device 100 assembles the computer chips required to implement a switching fabric on a computer card. The designer then utilizes the switching fabric in accordance with rules established by the designer of the chips. These rules permit the designer of a network device to set up switching paths through the switching fabric 120.

However, the internal structure of the switching fabric is not available to the designer of the network device 100. For this reason the internal structure of the switching fabric is shown schematically, as shown in FIG. 1.

The queue structure implemented by the designer of the switching fabric is indicated schematically as the queue structure 150. Various queues are utilized in queue structure 150, for example, queue 152, queue 154, queue 156, queue 158, queue 160, and a plurality of additional queues indicated by three dots 162. These queue structures are utilized by the switching fabric 120 in a manner knowledge of which is not available to the designer of network device 100.

Figure 3:
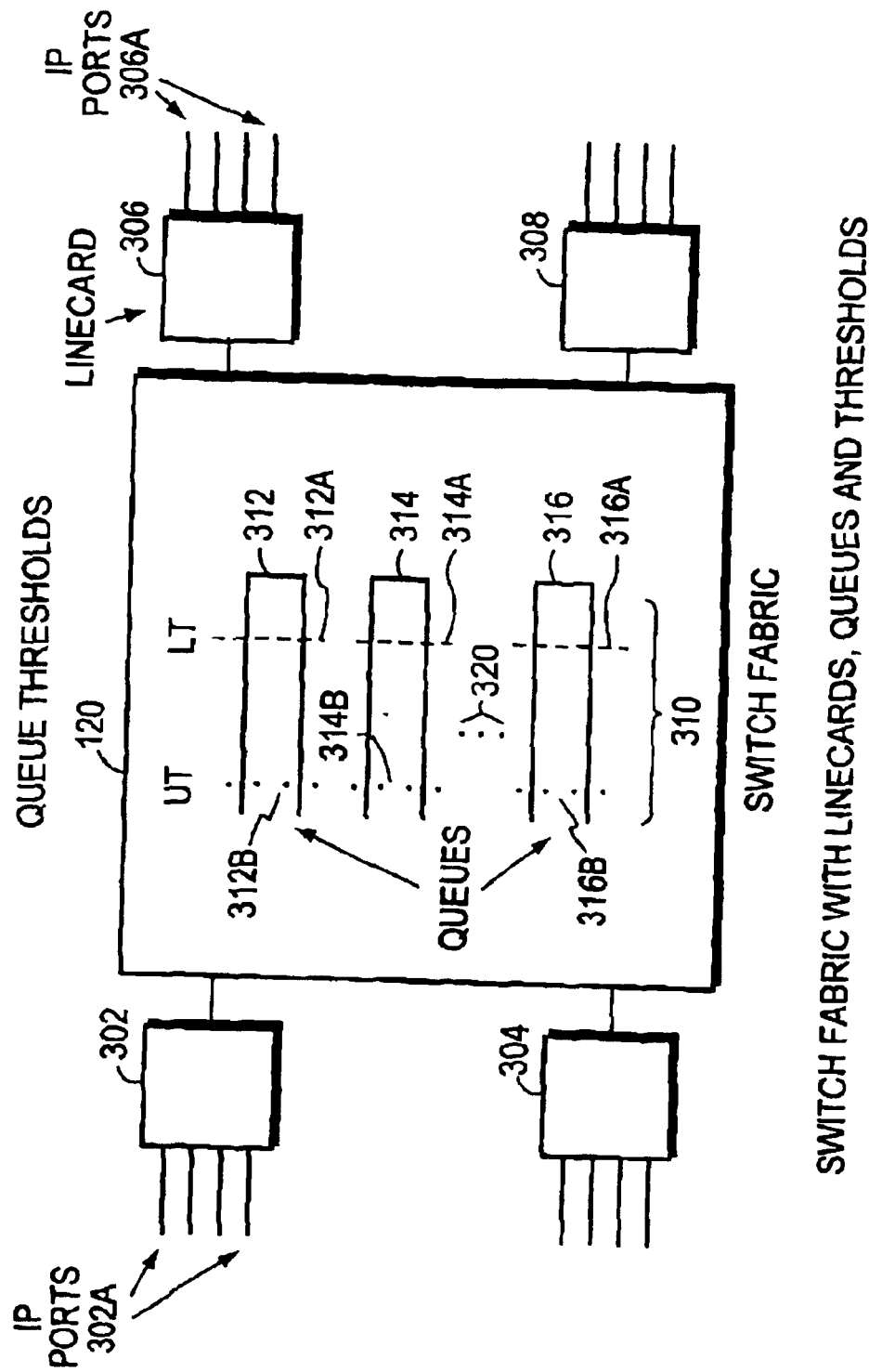
FIG. 3 is a block diagram of a switch fabric in accordance with the invention.

Turning now to FIG. 3, switching fabric 120 is shown schematically with linecards 302, 304, 306, 308, etc. Each of the linecards supports a number of ports, for example, Internet protocol ports, that is IP ports. For example, IP ports 302A are supported by linecard 302, and IP ports 306A are supported by linecard 306. The queue structure within switching fabric 120 is represented by queues 310.

Each of the queues 310 has a lower threshold (indicated as LT in FIG. 3). The lower threshold for queue 312 is indicated as threshold 312A. The lower threshold for queue 314 is indicated as lower threshold 314A. The lower threshold for queue 316 is indicated as threshold 316A. The lower thresholds 312A, 314A, 316A for their respective queues may be set when network device 100 boots. For example, an network device 100 boots when power is first applied to the device.

Action taken by the switching fabric when a segment enters a queue such as queues 310, and the queue is filled above the lower threshold value, 312A, 314A, 316A, is that a congestion indicator bit in the segment is "set".

Figure 7:
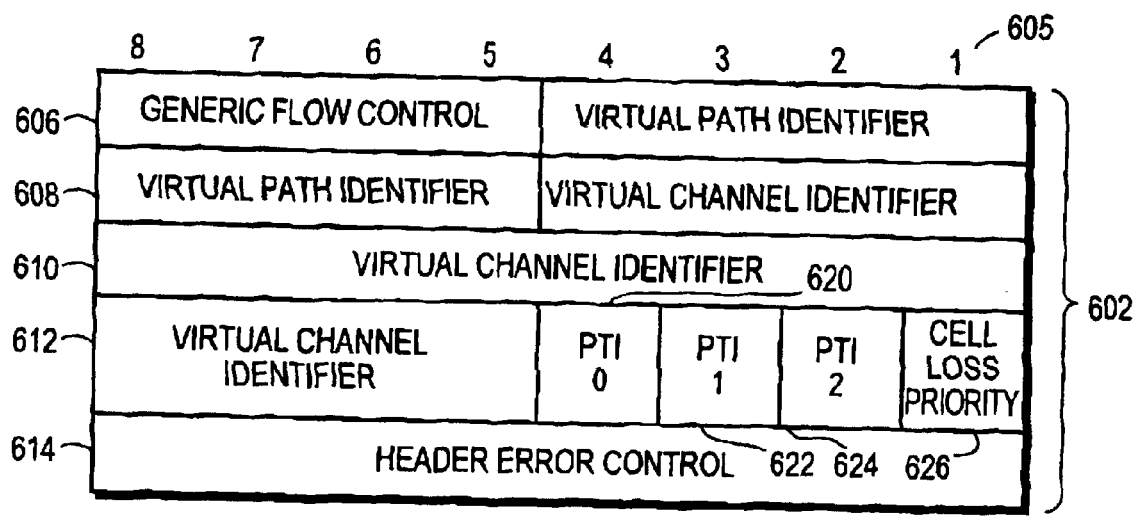
FIG. 7 is a block diagram of an ATM cell header.

For example, when Asynchronous Transfer Mode (ATM) switching fabric is used for switching fabric 120, and ATM cells are used for the segments, the bit which is set is the PTI 1 bit in field 622 of FIG. 7. A cell with the bit of field 622 set is variously referred to as a "marked" segment, or marked cell, as an "EFCI marked" cell, etc. "EFCI" stands for Explicit Forward Congestion Indication and is a term used in ATM network engineering. The present invention makes use of marked segments, having their congestion indicator bit set, in order to avoid congestion at network device 100.

In addition to a lower threshold, the queues 310 within switching fabric 120 each have an upper threshold (UT, as indicated in FIG. 3). The upper thresholds are indicated as UT 312B for queue 312, UT 314B for queue 314, and UT 316B for queue 316.

Action taken by the switching fabric 120 when a segment enters a queue such as queues 310 when the queue is filled above the upper threshold level 312B, 314B, 316B, etc., is that the entering segment is discarded. The upper threshold is also called Max Threshold.

Three dots 320 indicate that there are a plurality of queues within switching fabric 120. Many of these queues have a lower threshold, LT, such as lower thresholds 312A, 314A, 316A, etc. And when a segment enters such a queue which is filled above the lower threshold level, then the outgoing segment is "marked", by having the congestion indictor bit set. When the segments are ATM cells, the bit in field PTI 1 of field 622 is set.

Further, many of these queues have an upper threshold level UT such as UT 312B, 314B, 316B, etc. Any segment entering a queue filled above its upper threshold value is discarded.

Figure 4:
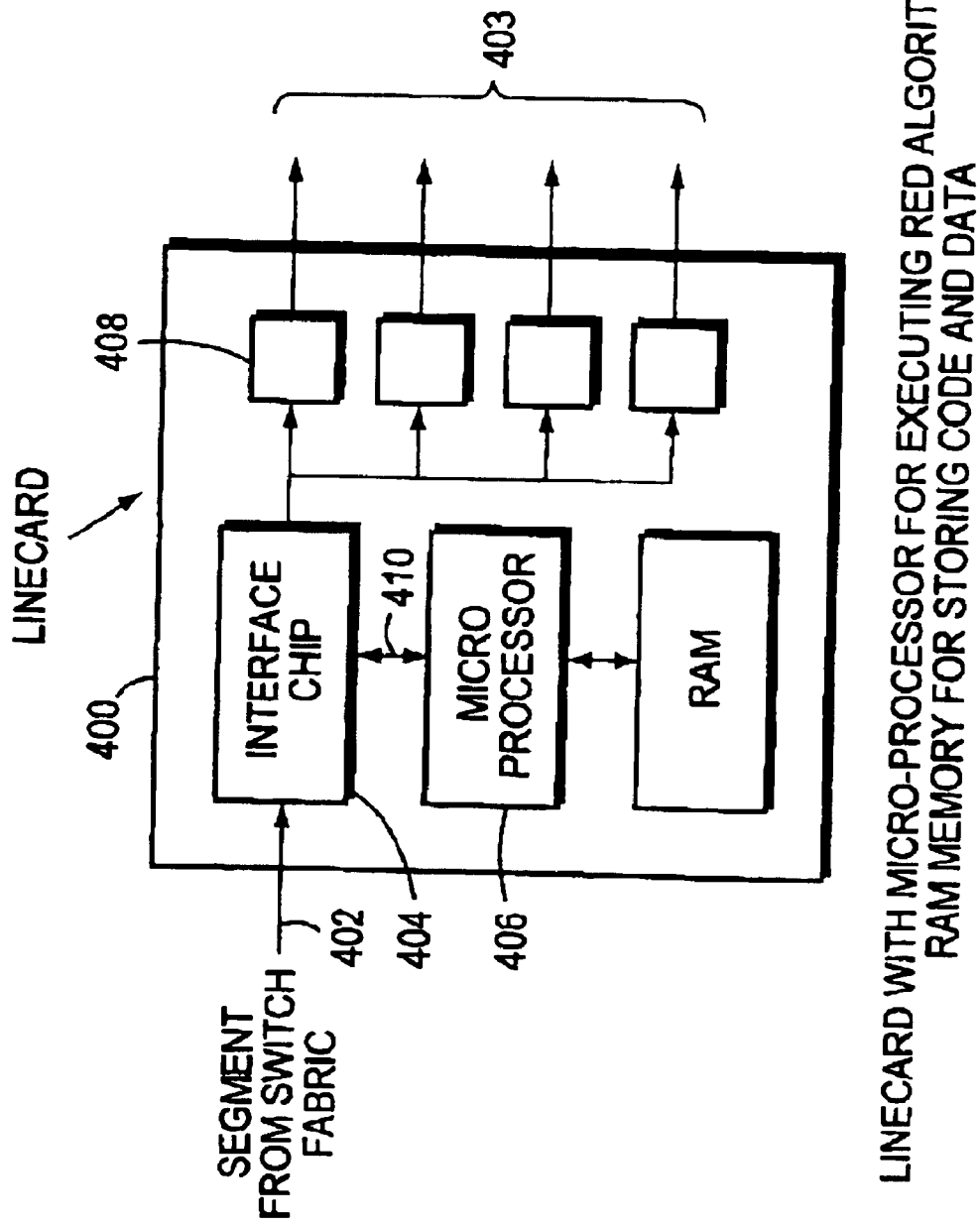
FIG. 4 is a block diagram of a linecard in accordance with the invention.

Turning now to FIG. 4, the internal structure of a representative linecard 400 is shown. A segment from the switch fabric is received through port 402. External ports 403 to the computer network are used to interconnect the linecard 400 to external links of the computer network. Interface chip 404 receives the segment from port 402. The sequence of segments is converted by Interface chip 404 into a packet for transmission to onto the external computer networks through ports 403. Microprocessor 406 may intervene in conversion of the segment into the proper format for the various outgoing links coupled through ports 403. Output driver chips 408 also assist interface chip 404 in converting the segments arriving from port 402 into the proper format for transmission out through ports 403. Microprocessor 406 may read fields of the segments received through port 403 from an external computer network. For example, interface chip 404 may have circuits which automatically read the header fields of the packets, and the contents of the header fields may be transferred along bus 410 to microprocessor 406.

Figure 5:
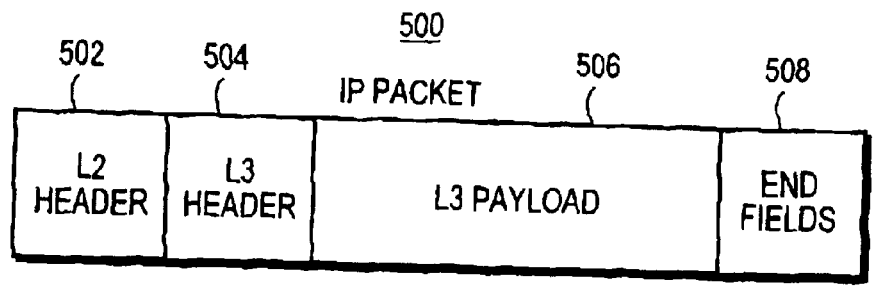
FIG. 5 is a block diagram of the fields of an IP packet.

Turning now to FIG. 5, a typical format of an IP packet is shown as packet 500. Packet 500 has a Layer 2 header 502. Packet 500 has a Layer 3 header 504. Also, packet 500 has a Layer 3 payload 506. In FIG. 5 the Layer 2 header 502 is indicated by "L2" header. The Layer 3 header 504 is indicated as the "L3" header, etc. Finally, IP packet 500 has end fields 508, including a cyclic redundancy check field. An IP packet such as IP packet 500 may typically be on the order of 1500 bytes in length.

Figure 6:
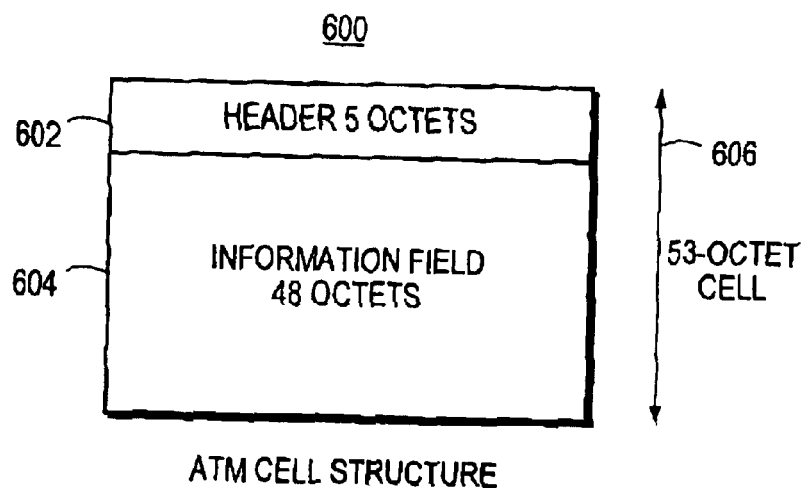
FIG. 6 is a block diagram of an ATM cell.

Turning now to FIG. 6, a typical ATM cell 600 is shown. The ATM cell 600 has header fields 602 and information field 604. The header field is 5 octets in length. An "octet" and a "byte" are synonyms. An octet, or byte is 8 bits in length, in the present exemplary embodiment of the invention. Arrow 606 indicates that ATM cell 600 is 53 octets in length. The header field 602 is 5 octets in length. Therefore, the information field 604 is 48 octets in length.

Turning now to FIG. 7, the five (5) octets of the ATM cell header fields 602 are shown. The bits of the field are shown by numbers 605.

Byte one (1) 606 contains a "generic flow control field utilizing bits 8, 7, 6, and 5. Also, byte one (1) 606 has a "virtual path identifier" field using bits 4, 3, 2, and 1.

Byte two (2) 608 has a continuation of the "virtual path identifier" field using bits 8, 7, 6, and 5. Also, byte (2) 608 has a "virtual channel identifier" field using bits 4, 3, 2, and 1.

Byte three (3) 610 continues the "virtual channel identifier" field utilizing all 8 bits of that field.

Byte four (4) 612 contains a continuation of the "virtal channel identifier" field utilizing bits 8, 7, 6, and 5. Byte four (4) 612 has a three (3) bit field referred to as the "pay load type indicator" field (PTI field), utilizing bits 4, 3, and 2. Finally, byte four (4) 612 has a "ATM cell loss priority" field 626 utilizing only one bit, bit 1.

Byte five (5) 614 has a "header error control" field utilizing all 8 bits.

The bits of the payload type indicator (PTI) field 620 in byte four (4) 612 are next discussed. PTI 0 in field 620 at bit position "4" indicates if the ATM cell is a user data cell (0), or an "OAM" cell (1). An OAM cell refers to the cell being an Operations, Administration, or Management cell, that is not a data cell.

PTI 1 bit in field 622 at the bit 3 position indicates whether or not a queue through which the ATM cell passed in the switch fabric is filled beyond its lower threshold, with a value "1" indicating that some queue in the switch fabric through which the ATM data cell passed is filled beyond the lower threshold, and a value "0" indicating that none of the internal queues the ATM data cell passed through were filled beyond their lower threshold value. The PTI 1 bit of an ATM data cell is also called the "EFCI" bit. An ATM data cell having the PTI 1 bit in field 622 logically "set", usually having a value of "1", is referred to as a "marked" ATM cell, or as an "EFCI marked" ATM cell as described with reference to FIG. 3 herein above.

Bit PTI 2 in field 624 indicates whether the ATM data cell is the last ATM data cell of a packet (1) or not (0).

The bit PTI 1 in field 622 of a data cell is utilized in the present invention to indicate whether or not a queue within the switch fabric was filled beyond the lower thresh-old value. For example, internal queues of the switching fabric are indicated as queues 150, that is queue 152, 154, 156, 158, 160, etc., and the additional plurality of queues three dots 162. Also in FIG. 3, queue 312 is shown having lower threshold 312A. Queue 314 is shown having lower threshold 314A. Queue 316 is shown having lower threshold 316A. The switch fabric is designed so that if a data cell passing through the switching fabric passes through an internal queue filled above its lower threshold value, then the PTI 1 bit in field 622 is set to the value "1".

In operation, a data cell entering the switch fabric from an input linecard always has the PTI 1 bit set to a value of "(0)". In the event that the cell passes through a queue of the switch filled above the queue lower threshold value 312A, 314A, 316A, etc., the PTI 1 bit of the data cell is set to the value "1".

An ATM cell which is "marked" for the purpose of the present exemplary embodiment of the data invention is a cell having the two left most bits in the PTI field have the value "01". The PTI0 field 620 value of "0" indicates that the cell is a user data cell. The PTI 1 field 622 value "1" indicates that a queue through which the ATM cell has passed in the internal structure of the switching fabric 120 is filled above its lower threshold value, 312A, 314A, 316A, etc.

Figure 8:
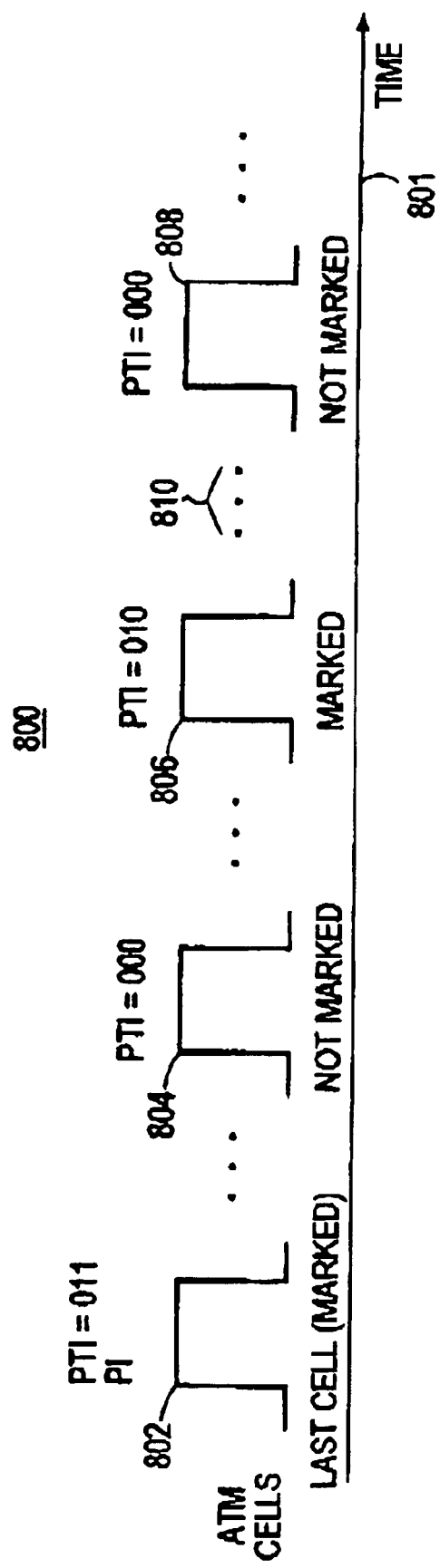
FIG. 8 is a timing diagram of segments reaching a linecard in accordance with the invention.

Turning now to FIG. 8, a sequence of ATM cells reaching input port 402 of linecard 400 is shown as ATM cell sequence 800. ATM cell 802 has its PTI bits set to "011". ATM cell 804 has its PTI bits set to "000". ATM cell 806 has its PTI bits set to "010". ATM cell 808 has its PTI bits set to "000". Time of arrival of the ATM cells at port 402 is indicated by time line 801.

The first ATM cell to arrive in the drawing 800 is ATM cell 808, and it is a data ATM cell, as indicated by the PTI 0 bit having the value "0", it is not marked as having passed through a queue having its lower threshold exceeded by the value of its PTI 2 bit having the value "0", and it is not the last ATM cell of a packet as is indicated by the PTI 2 bit having the value "0".

Three dots 810 indicate that a large number of additional ATM cells may have arrived at port 402 of linecard 400. The next indicated ATM cell to arrive in linecard 400 is ATM cell 806, having its PTI bits having the values "010". Again, the PTI 0 bit having the value "0" indicates that the ATM cell is a user data ATM cell. The ATM cell is marked as having passed through a queue within the switching fabric 120 which is filled beyond its lower threshold value by the PTI 1 bit having the value "1". Again, the ATM cell is not the last ATM cell of a packet as is indicated by the PT 2 bit having the value "0".

A still later arriving ATM cell 804 at port 402 of linecard 400 has its PTI bits set to the value "000", and so is a data ATM cell, is not "marked" as having passed through a queue filled above its lower threshold value, and is also not the last ATM cell of a packet.

A still later arriving ATM cell 802 at port 402 of linecard 400 is indicated by ATM cell 802, and ATM cell 802 has its PTI bits set to the value "011". This ATM cell is also a user data ATM cell, it is marked as having passed the through a queue which was filled above its lower threshold value, by the value of the PTI 1 bit having the value "1". Also ATM cell 802 is the last ATM cell of a packet as the value of the PTI 2 bit having the value "1" indicates.

For each output port, the ratio of the number of the marked packets to the total number of packets arriving at input port 402 of linecard 400 and destined for the output port is computed. For example, the total number of ATM cells arriving during a specified time period destined for each output port may be counted. Also, for each output port, the number of ATM cells being "marked" as having passed through a queue whose filling exceeds its lower threshold value may be counted by monitoring the value of the PTI 1 bit, found in field 622. This per output port ratio may be computed at regularly timed intervals. For example, the "standardized" round trip time for the Internet is taken as 100 milliseconds, and this time period for computing the ratio has been found to be convenient. The ratio is computed by simply counting the number of ATM data cells arriving at port 402 and destined for each output port, and counting the number which have the PTI 1 bit of field 622 set to value "1". This ratio is computed for each and every output port, for example, every 100 milliseconds in the present exemplary embodiment of the invention.

Alternatively, when the switching fabric uses segments other than ATM cells, selected fields of the segment may be used to define a flow, and the number of marked segments and the number of unmarked segments counted for each flow. The ratio of marked to unmarked segments can then be computed for each flow. Each flow may then be separately treated by the RED algorithm.

Figure 9:
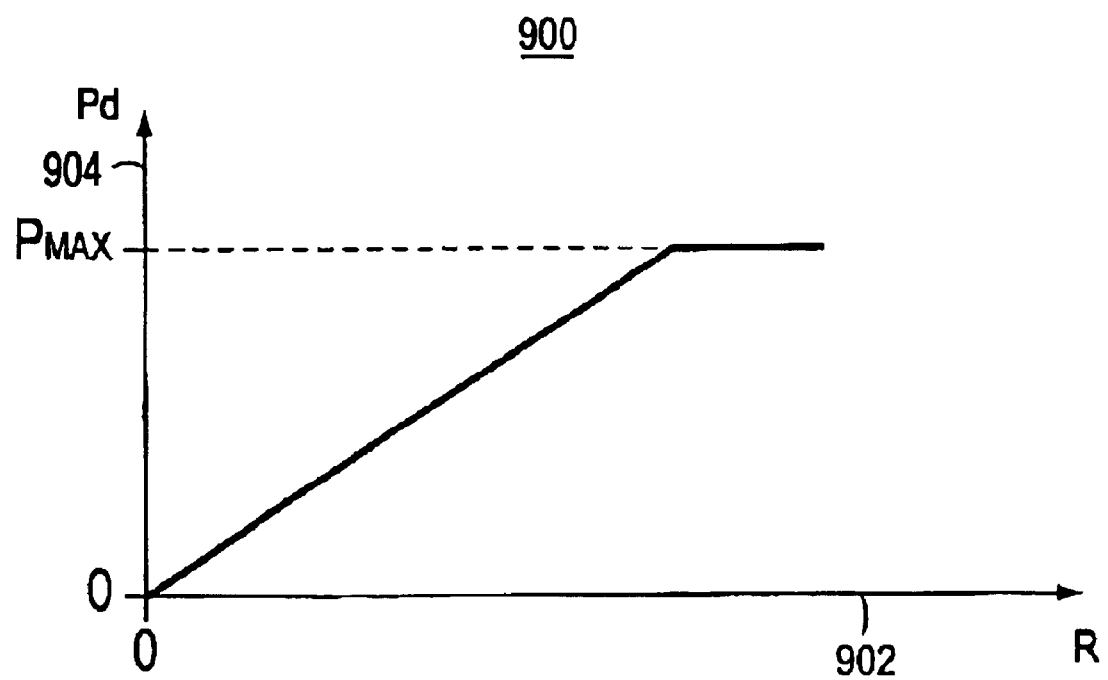
FIG. 9 is a graph of a random selection in a RED algorithm.

Turning now to FIG. 9, a random selection calculation for use in a RED algorithm is shown. The periodically calculated value of the ratio "R" of the number of marked segments received by an output port to the total number of segments received by the output port during a chosen time period is shown plotted along the horizontal axis 902. The probability "Pd" that a packet should be discarded is plotted along the vertical axis 904. The graph of FIG. 9 is used to illustrate the calculation of the discard probability from the periodically measured value of R.

The discard probability Pd is calculated from the total number of segments received by the port Nt, and the number of marked segments received by the port Ne, as follows:

$$Pd=P\max*(Ne/Nt)$$

"Pmax" is a parameter chosen by a person. The largest value which Pmax can have is 1.0, which would make Pd equal to unity in the event that all segments received are marked.

The ratio R is calculated periodically by $$R=Ne/Nt$$

A random number is then chosen between 0 and 1.0. The value of Pd calculated above is then compared with the random number. In the event that the calculated value of Pd exceeds the random number, the segment, and the packet to which it belongs, is discarded.

Additional parameters may be used to choose the packet to be discarded. For example, a class of service may be indicated by a bit in the packet, and preference given to transmission of packets with one class rather than another class. Also, flows may be identified by the packet source address and destination address, or by other parameters in the packet header. The probability of discarding a packet may then be influenced by the flow, as well as by other parameters carried in the packet header.

In a preferred embodiment of the invention, microprocessor 406 of linecard 400 executes a computational process for implementation of the invention. A pseudo code description of an exemplary computational process follows, where the segments are taken to be ATM cells and the segment marking is to "set" the EFCI bit.

Define: Nt: total number of packets (per class per port)
Ne: number of EFCI-marked packets (per class per port)
Pd: Packet Drop probability (per class per port)
MaxP: Maximum Packet Drop probability (per class)
FREEZETIME: 100 msec
last_adjust_time: last time Pd adjustment was made (per class per port)
Algorithm:

```
Transmitting new packet
Nt++
If (packet is EFCI-marked){
    Ne++
    If (random( ) < Pd){
        discard packet
    } else {
        transmit packet
    }
} else{/* packet is not EFCI-marked */
    transmit packet
}
if(now - last_adjust_time > FREEZETIME){
    Pd = Ne/Nt * MaxP
    Ne = Nt = 0
    last_adjust_time = now
}
```

The RED algorithm relies on the switch fabric 120 chips to mark all of the segments when the segments pass through a queue where the lower threshold, for example threshold 312A, 314A, 316A, etc., of the queue is exceeded by filling of the queue.

For example, when an ATM switch fabric and ATM cells are used for the segments, as a packet is readied for transmission over an output port, Nt for the output port is incremented and the EFCI marking of the packet is examined. The EFCI marking of the packet is examined by microprocessor 406 reading from interface chip 404 the value of the PTI 1 bit at field 622. If one segment of the packet is marked by having its PTI 1 bit set to "1", then the packet is considered to be a "marked packet". If the packet is marked, Ne is incremented and the packet is discarded with probability Pd. If the packet is not EFCI marked, it is transmitted. Every FREEZETIME (measured in milliseconds) Pd is updated by multiplying the ratio of Ne/Nt with MaxP. The ratio of Ne/Nt varies between 0 and 1.0. If the port is not congested, Ne will be zero, since the queues are mostly empty. If congestion begins, the number of marked packets, Ne, is equal to the queue accumulation in excess of the threshold value during the FREEZETIME interval. For example the FREEZETIME interval is chosen as a 100 millisecond timing interval to match the universal "Internet Round Trip Time", which is taken to be approximately 100 milliseconds. By normalizing Ne with Nt, the resulting ratio is used as the input parameter of the RED algorithm. Simulation shows that the Ne/Nt value tracks the queue oscillations fairly well and therefore can serve as an input parameter for the calculation of probability of dropping a packet in accordance with the RED algorithm.

Discarding the packet with probability Pd is done by simply obtaining a random number of the appropriate range from a random number generator. In the event that the random number is less than the value of Pd, then the packet is discarded. In the alternative event, the packet is transmitted.

Efficient Implementation of RED

The computation of the probability of dropping a packet, Pd in the RED algorithm may be efficiently implemented in accordance with the following computational scheme.

An efficient computation of Pd=Ne/Nt*MaxP is given below. This computation may be efficiently implemented in hardware logic circuitry in a chip.

```
initialize M
(1) multiply Ne by M, (let x = Ne * M)
(2) compute the value "index", where index = div(x), and where the
    integer divide function div ( ) can be implemented as,
    div(n){
        int i;
        for (i=0; i<infinity; i++){
            n = n - Nt;
            if (n <= 0) break;
        }
        return(i);
    }
(3) Pd = table[index], where the i-th table entry is initialized by
    table[i] = i/M * MaxP;
```

The ease of implementing the above computation in hardware is shown by the following. Note that in this implementation, (i) if M=2 ^m (that is M=2 raised to the m-th power), only shift operations are needed, and (ii) truncation error for Ne/Nt is at most 1/M (e.g., M=16, error<6%, M=32, error<3%). This computation may be implemented by logic gates, for example in an application specific integrated circuit (an ASIC chip), or any other convenient implementation of hardwired logic gates or with a microprocessor.

Performance Simulations

Figure 10:
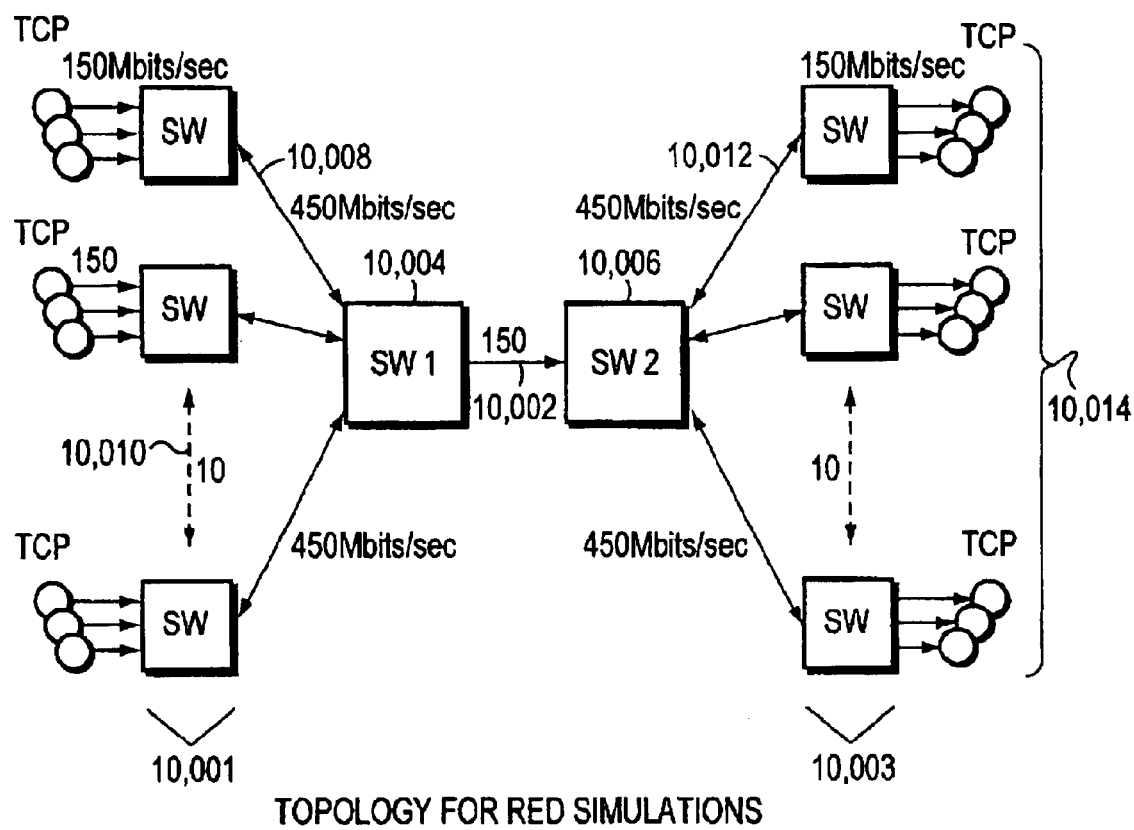
FIG. 10 is a block diagram of a computer network used in simulation studies.

The performance of the present invention in a simulated congested network is examined. For example, an ATM switching fabric using ATM cells for the segments is assumed. FIG. 10 shows the topology of the simulated network. A total of 30 transmission control protocol (TCP) connections are aggregated into a single network device, such as network device 100 shown in FIG. 1, and then through a link to another similar network device.

Three TCP/IP connections are aggregated into each of the front end switches 10,001. The front end switches are connected by links such as link 10,008 to network device 10,004. Network device 10,004 is an example of network device 100 shown in FIG. 1. All of the connections traverse and inter-switch link 10,002 between network device 10,004 and network device 10,006. This connection creates a bottleneck output port in network device 10,004. The connections are aggregated in such a way as to create three (3) TCP/IP "transmission control protocol" connections per input port of network device 10,004. A queue is maintained at the output port of network device 10,004 to link 10,002 for each input port of network device 10,004.

Consequently, each ten (10) per-port input queues at the congested output port on network device 10,004 contains 3 TCP/IP flows. Each of the ten (10) per-port input queues were configured with a lower threshold 312A, 314A, 316A, etc., that is an EFCI marking threshold. Each of the input queues also were configured with and an upper threshold 312B, 314B, 316B, etc., that is a Max threshold. When the queue level (length) exceeds the EFCI marking threshold the incoming data cell is marked by setting the PTI 1 bit in field 622 to the value "1". When the queue level (length) exceeds the Max threshold, the incoming packet is dropped.

Each TCP connection is fed by an infinite data source. The link speeds are as marked in FIG. 10. Each of the TCP/IP inputs to switches 10,001 are at 150 megabits per second. Link 10,008 is a 450 megabit per second link, as are the other input links to network device 10,004. Dotted lines 10,010 show that 10 input linecards, each having 3 TCP connections of 150 megabits per second are connected to network device 10,004.

The inter network device link 10,002 is shown with a 150 megabit per second capacity. Downstream network device 10,006 also has connected thereto 10 front end switches 10,003 each connected to 3 ports, where the ports operate at 150 megabits per second bandwidth, and the links, for example, link 10,012 operate at 450 megabits per second. There are ten front end switches 10,003 connected to network device 10,006 by 450 megabit per second links, for example link 10,012. Each front end switch 10,003 delivers packets to three (3) TCP/IP receiver stations 10,014.

The delay across the inter-switch link 10,002 was set at 25 milliseconds to simulate a typical wide area network scenario. The packet size in the TCP connections is 1024 bytes in length.

A result is that the maximum throughput which could be achieved in this simulation on the congested link 10,002 is approximately 138 megabits per second.

A number of scenarios with various combination of: lower threshold settings, that is EFCI marking; various upper threshold settings, that is Max thresholds; and, various values of Pd update intervals were simulated. The results can be summarized in three (3) cases described herein below. For comparison purpose, two (2) scenarios in which only the upper threshold mechanism was used were also simulated.

Before examining the performance of the RED algorithm as presented in the present invention, it is instructive to look at the performance of the network with the RED computation disabled. That is only the upper threshold mechanism is enabled. In this case, when a queue's Max threshold is reached, incoming packets are discarded.

Turning now to FIG. 11 (A-D) the case of using only a Max threshold mechanism is shown. FIG. 11A and FIG. 11B show the results for the case with Max threshold of 300 cells and no RED algorithm. FIG. 11A plots the received packet sequence of the 30 connections, with only a few representative sequences sketched. FIG. 11B plots the aggregate queue length (sum of all per-input queues) of the congested port. The small queue build up and long periods of empty/near empty queue indicates that the link is under utilized. The measured throughput is 124.7 megabits per second or 90% of the link bandwidth.

Figure 11A:
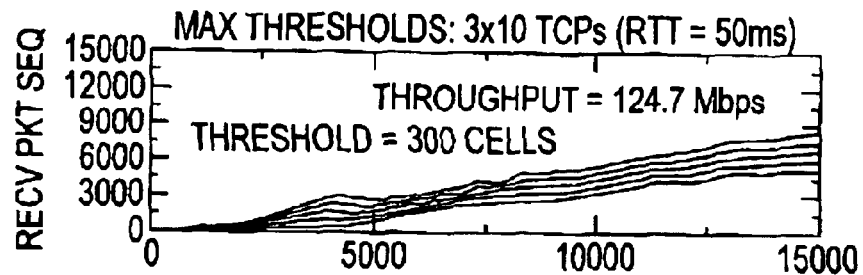
FIG. 11A-FIG. 11D are graphs of the results of simulation studies.
Figure 11B:
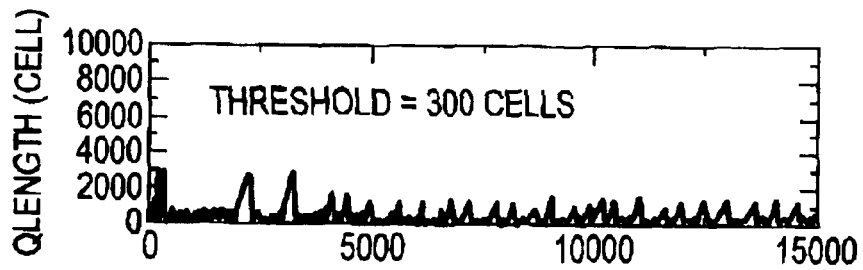
Figure 11C:
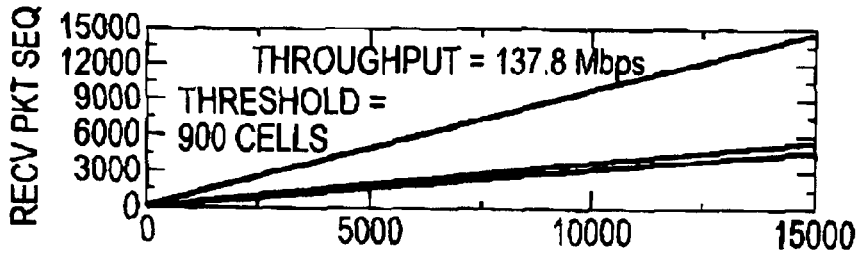
Figure 11D:
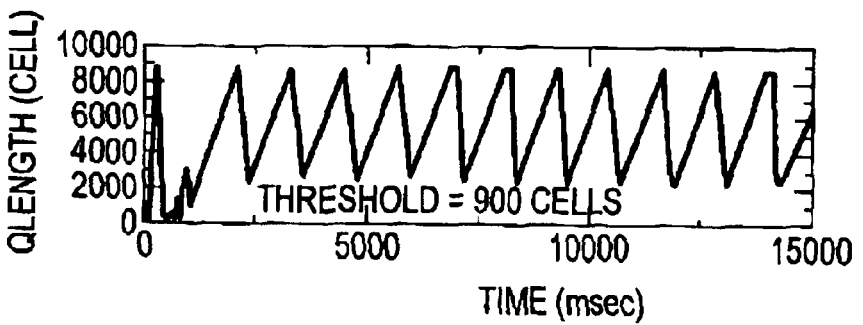
Figure 12A:
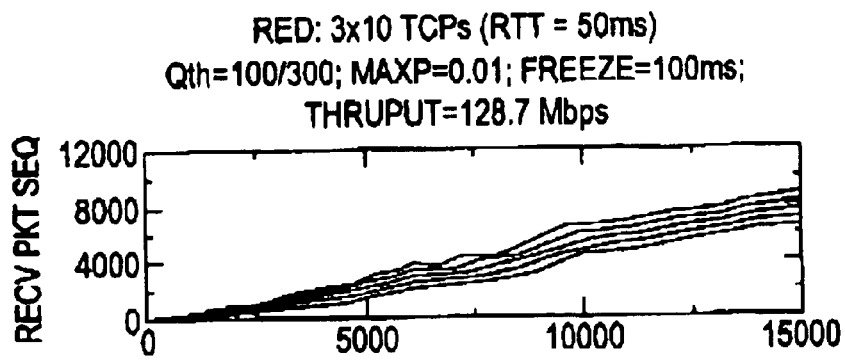
FIG. 12A-FIG. 12D are graphs of the results of simulation studies.
Figure 12B:
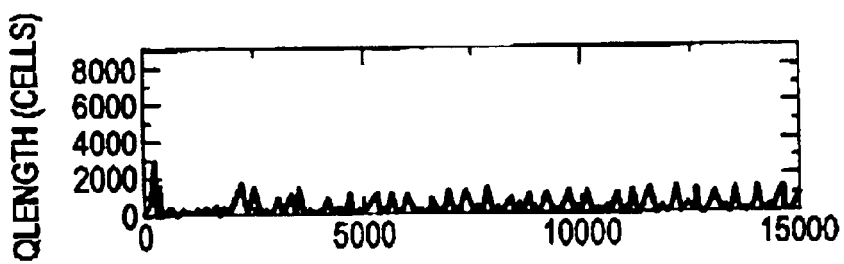
Figure 12C:
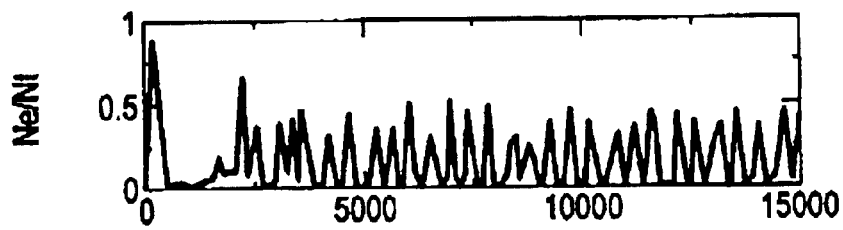
Figure 12D:
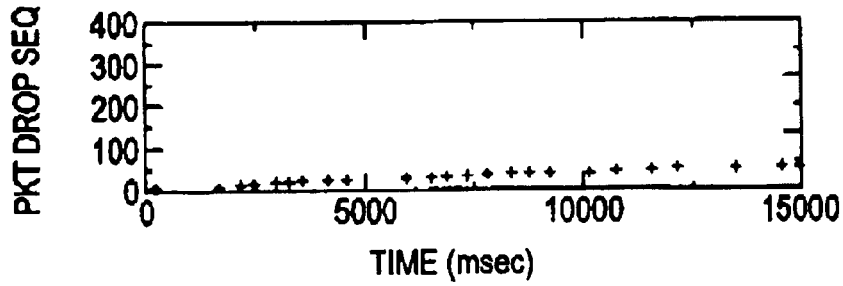

FIG. 11C and FIG. 11D show the results when the Max threshold is increased from 300 to 900 cells. From FIG. 1 ID, it can be observed that the congested link is now fully utilized, since the aggregate queue is always non-empty. However, the queue oscillates sharply between 2,000 and 9,000 segments. Oscillatory behavior is indicative of unwanted synchronization among a number of TCP sources. Furthermore, FIG. 11C shows that fairness among the connections is very poor. One group of connections grabbed more than twice the bandwidth than another group of connections.

Turning now to FIG. 12 (A-D), a case using the RED algorithm with the ratio of EFCI marked cells to total cells received is shown. FIG. 12 (A-D) gives results for parameter settings of: EFCI-threshold=100 cells, and Max-threshold= 300 cells. FIG. 12A shows the received packet sequence of the thirty (30) TCP connections, with only a few representative connections sketched. The total throughput of all the connections is calculated at 128.7 megabits per second, or 93% link bandwidth. FIG. 12B shows the aggregate queue length at the congested output port. FIG. 12C plots the ratio of Ne/Nt versus time. It can be observed that the ratio tracks the aggregate queue length quite well. FIG. 4D plots the drop sequence number of all the dropped packets. Note that only a small number of packets were dropped. Dropping only a small number of packets indicates that most of the dropped packets were dropped by the upper threshold mechanism.

The results of this scenario are very similar to those shown in FIG. 11A and FIG. 11B. Thus, we can conclude that if the Max threshold is set too low, the benefits of the RED computation cannot be realized, as the upper threshold mechanism dominates the packet drop.

Turning now to FIG. 13 (A-D), a further case using the RED algorithm with the ratio of EFCI marked cells to total cells received is shown. FIG. 13 (A-D) gives results for parameter settings of: EFCI-threshold=300 cells, and Max-threshold=900 cells.

Figure 13A:
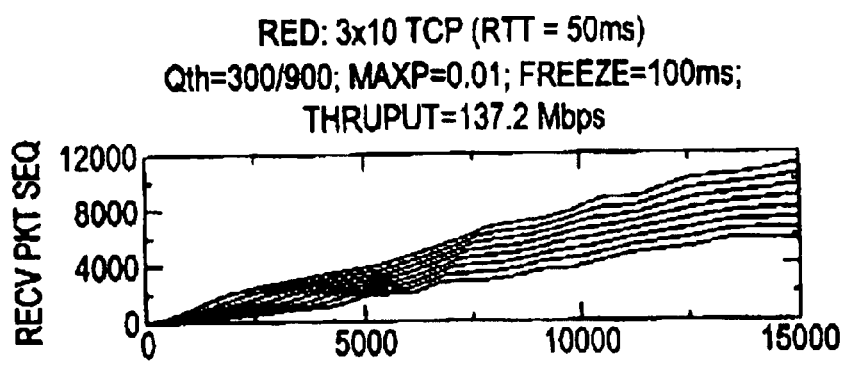
FIG. 13A-FIG. 13D are graphs of the results of simulation studies.
Figure 13B:
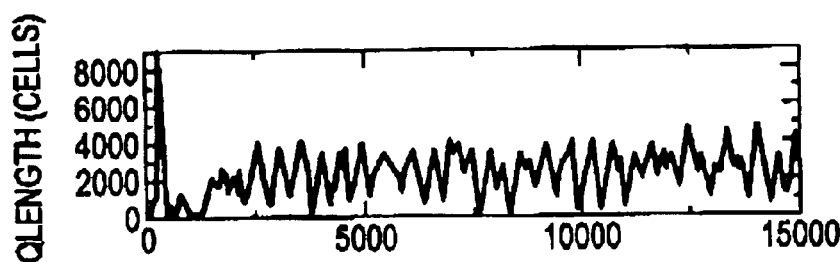
Figure 13C:
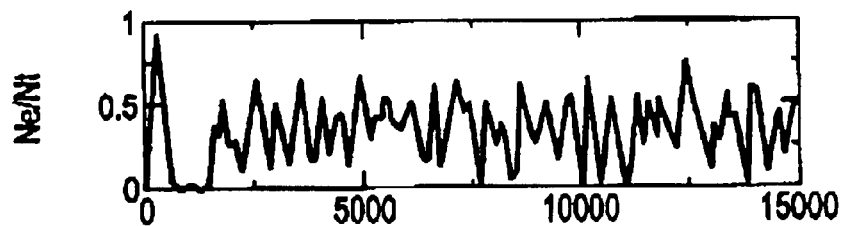
Figure 13D:
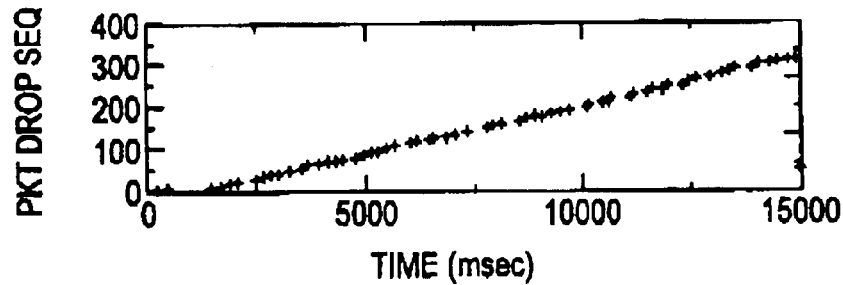
Figure 14A:
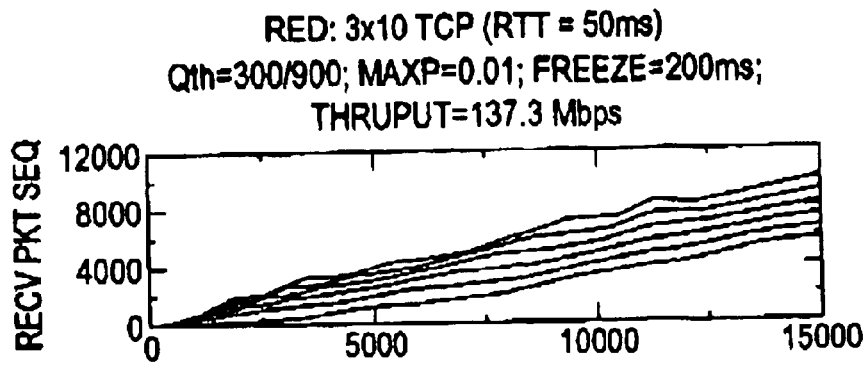
FIG. 14A-FIG. 14D are graphs of the results of simulation studies.
Figure 14B:
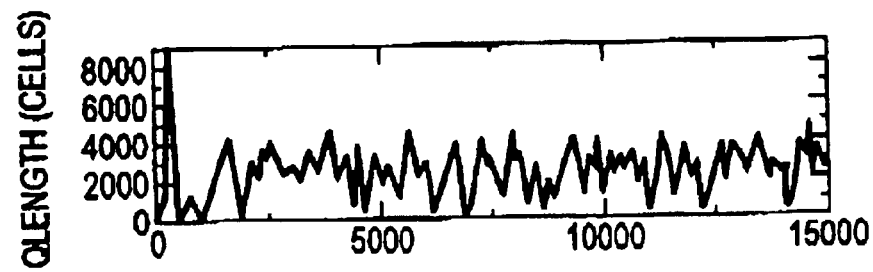
Figure 14C:
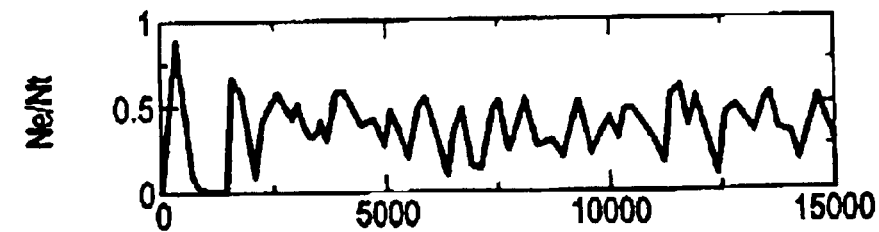
Figure 14D:
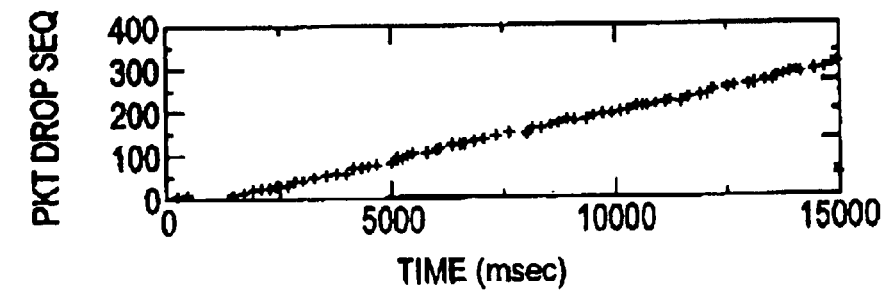

FIG. 13A shows the received packet sequence of the thirty (30) TCP connections, with only a few representative connections sketched. FIG. 13B shows that the congested link is very near being 100% utilized. FIG. 13C shows that Ne/Nt tracks the aggregate queue length very closely. FIG. 13D shows that a fair amount of packets is being discarded by the RED mechanism. The effect of the RED mechanism can be seen by comparing FIG. 13B with FIG. 11D. In FIG. 11D the aggregate queue length exhibits large oscillations due to TCP synchronization, whereas in FIG. 13B the RED algorithm functions to randomly drop packets from different connections, and thereby avoids TCP synchronization.

Effects of Pd Update Intervals

Turning now to FIG. 14 (A-D), the simulation results of changing the value of FREEZETIME, the update time interval for calculating the value of Pd are shown. The scenario of FIG. 13 (EFCI threshold=300 cells, Max threshold=900 cells) was repeated, with the update interval increased to 200 milliseconds. The results are plotted in FIG. 14A through FIG. 14D. It can be observed that the only noticeable difference from the FIG. 13 (A-D) results for FREEZETIME=100 milliseconds is the ratio Ne/Nt shown in FIG. 14C. Although the ratio still tracks the aggregate queue length quite well, the graph of FIG. 14C is a "smoother" curve compared with the graph shown in FIG. 13C. This observation is understandable, since a larger measurement interval tends to absorbs the small fluctuations in queue length. Thus the effect of increasing the update interval in the RED algorithm tends to smooth variations in the computed parameter.

Effects of MaxP

The parameter MaxP in the RED algorithm was varied and simulations run. The simulations show that a small value in the range from 0.5 to 2% is preferable. A value of 1% was used for the results presented herein.

Multiple Drop Preference

Service classes with different drop preferences were simulated. Different IP classes of service were established by configuration. Different classes of service are stored in different queues in the switching fabric. For example, up to four classes could be defined in the simulation. The CLP bit in the standard ATM cell header is used to establish preferences as the cell passes through the ATM switching fabric.

The RED algorithm can easily handle multiple drop preferences within each class. By configuring different MaxPs and/or Ne/Nt for each drop preference, throughput differentiation for connections with different drop preferences were studied.

In this discussion, two options are examined: (1) using per-class Ne/Nt, and (2) using per-class per preference Ne/Nt. Both options used per preference MaxPs, as described next.

First, the per-class Ne/Nt option is discussed. In this option only one ratio of Ne/Nt per-class was maintained. Throughput differentiation is achieved by configuring different MaxPs for each drop preference. This is the simplest option to implement.

Next the per-class per-reference Ne/Nt Option is discussed. In this option, a ratio of Ne/Nt is maintained per-class per-preference. Let Ne0 and Ne1 denote the number of marked segments (EFCI-marked ATM cells in the simulation) with drop preference 0 and 1, respectively, and Nt0 and Nt1 the total number of segments with drop preference 0 and 1.

Also let:

$Ne0+1 = Ne0 + Ne1$, and $Nt0+1 = Nt0 + Nt1$.

Let Pd0 and Pd1 denote the drop probabilities of segments with preferences 0 and 1.

Pd0 and Pd1 are computed by, $Pd0 = (Ne0/Nto+1)*MaxP0$ $Pd1 = (Ne0+1/Nt/0+1)*MaxP1$ That is, the drop probability of the higher preference segments (preference 0) is proportional to the number of marked segments (EFCI-marked ATM cells) of its preference level only, whereas the drop probability of the lower preference Pd1 is proportional to the sum of the number of marked segments of both its preference level and those of higher preference levels. A result of this option is that the drop probability for each preference level is now also dependent on the relative traffic loads of each traffic type. In particular, the smaller the load for a higher preference level is, the lower its drop probability. By correlating the drop probability with the traffic load, better throughput differentiation can be achieved. The following examples serve to illustrate this effect.

Example 1

Assume 500 cells of each preference level are received from the switching matrix by the output port. Also assume that half of all cells are marked. Since the preference level is transparent to the marking mechanism, the fraction of marked cells and each preference level is the same (50%). Then:

$Ne0/Nt0+1 = 250/10000 = 0.25$, and $Ne0+1/Nt0+1 = 500/1000 = 0.5$.

Thus, in addition to MaxPs, the drop probability Pd0 is further reduced by 50% relative to Pd1.

Example 2

Assume 100 and 900 cells of preference level 0 and 1, respectively are received. Assume, as before, that half of all cells are marked. Then:

$Ne0/Nt0+1 = 0.05$ and, $Ne0+1/Nt0+1 = 0.5$.

Consequently, the drop probability Pd0 of the preferred class is further scaled down by a factor of 10 relative to the less preferred class drop probability Pd1.

Simulations of Per-Class and Per-Class Per Preference Options.

Turning now to FIG. 15 (A-D), simulation results for per class and per class preferences are shown. Simulation results for the two options, per-class and per-class per-preference values of Ne/Nt are presented. The topology simulated is the same as shown in FIG. 10. To introduce traffic of different preference levels, one in each of the three TCP connections going into a first stage switch 10,001 as shown in FIG. 10, is classified as preference 0, with the other two connections preference 1. Thus a total of 10 connections are of preference 0, and 20 connections are of preference 1. A number of different combinations of MaxP0 and MaxP 1 were simulated.

Figure 15A:
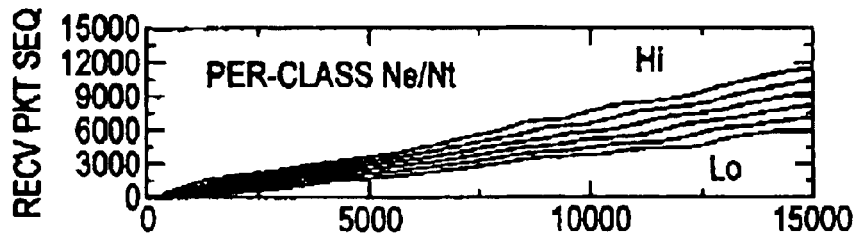
FIG. 15A-FIG. 15D are graphs of the results of simulation studies.
Figure 15B:
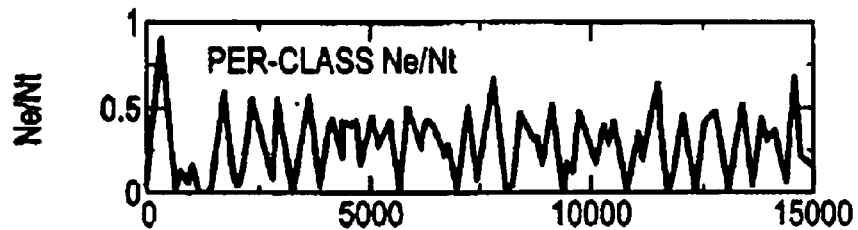

FIG. 15A through FIG. 15D show the received packet sequence and the Ne/Nt plots for both the per-class Ne/Nt and the per-class per-preference Ne/Nt options. MaxP0 and MaxP1 are set to 1.0% and 2.0%, respectively. FIG. 15A shows the received packet sequence of the thirty (30) connections for the per class Ne/Nt option. While the 10 high preference connections achieved higher throughput than the 20 lower preference connections, the distribution of the bandwidth among the connections is less than optimal.

Figure 15C:
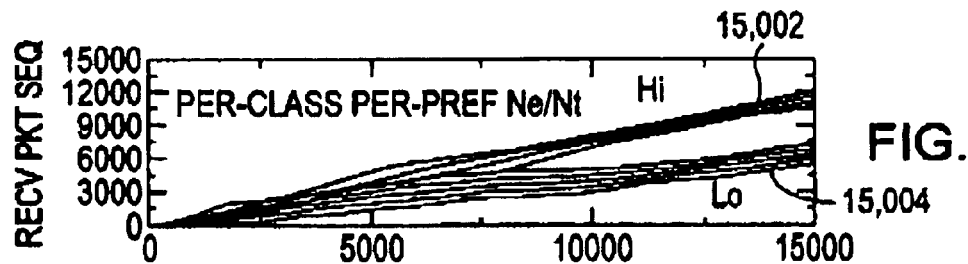

FIG. 15C shows the corresponding results for the per-class per-preference Ne/Nt option. The high preference packets received by the bottleneck port of network device 10,004 to inter-switch link 150 are shown in graph 15,002, while the number of low preference packets received are shown in graph 15,004. Comparing FIG. 15A and FIG. 15C, we can clearly see that throughput differentiation is more pronounced for the per-class per-preference Ne/Nt than for the per-class Ne/Nt option.

Figure 15D:
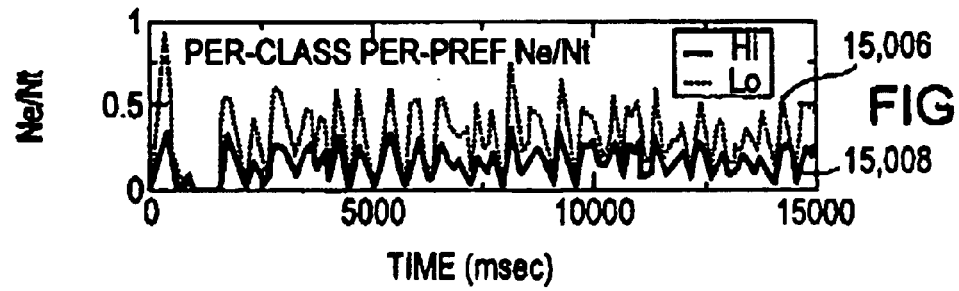

FIG. 15D shows the value of Ne/Nt for high preference traffic in graph 15,008, and shows corresponding values for low preference traffic in graph 15,006. FIG. 15D shows that more packets of low preference traffic (graph 15,006) are dropped than are dropped for high preference traffic (graph 15,008).

Simulations using various combinations of MaxP0 and MaxP1, also support the above observation. Therefore, it is concluded that the per-class per-preference option provides a more preferable distribution of bandwidth.

A key ingredient in the present invention of the use of the RED algorithm is the use of the number of marked segments which are marked by the switching fabric as an indicator of the degree of port congestion. The RED algorithm as described herein requires minimum computing resources and can thus be implemented in an ASIC chip such as chip 404, or in a microprocessor such as microprocessor 406, mounted on a linecard of a network device 100. Simulation results show that the invention performs quite well for the scenario studied as described here and above. Further, the invention works well in differentiating throughput for different classes of traffic. Simulation shows that throughput differentiation can be achieved for different classes of traffic by the present invention.

It is to be understood that the above-described embodiments are simply illustrative of the principles of the invention. Various other modifications and changes may be made by those skilled in the art which embodied the principles of the invention and fall within the spirit and scope thereof.

What is claimed is:

1. A network device, comprising:
a first linecard receiving input computer network packets from a computer network, said line card translating said packets into segments;
a switching fabric receiving segments from said linecard, said switching fabric to route said segments to a desired output linecard, said switching fabric having at least one queue therein, said queue having a threshold such that in the event that a segment arrives at said queue and said queue is filled above said threshold, a bit of said segment is set as said segment is passed out of said queue, said bit being set "marking" said segment as that segment having passed through a queue filled above said lower threshold level;
a second line card receiving said segments from said switching fabric, said second linecard translating said segments into a computer network packet for transmission by said second linecard out through a port connected to an output computer network;
a circuit determining whether or not a particular segment of said segments received by said second linecard has said bit set indicating that said segment is marked, and in response to detecting a segment as being marked, discarding said output packet in accordance with a random probability, and in response to detecting that no segment of said output packet is marked, transmitting said output packet onto said computer network.

2. The apparatus as in claim 1 wherein said circuit further comprises a hardware computer chip.

3. The apparatus as in claim 1 wherein said circuit further comprises an ASIC chip mounted on said output linecard.

4. The apparatus as in claim 1 wherein said circuit further comprises a microprocessor.

5. The apparatus as in claim 1 wherein said circuit further comprises a hardware chip operating with a microprocessor.

6. The apparatus as in claim 1 wherein said circuit further comprises:
logic for detecting a priority class of at least a selected packet of said input computer network packets, and in response to said priority class, selecting class specific values in calculating a probability for discarding an output packet corresponding to said selected input packet.

7. A network device, comprising:
a first linecard receiving input computer network packets from a computer network, said line card translating said packets into segments;
a switching fabric receiving segments from said linecard, said switching fabric to route said segments to a desired output linecard, said switching fabric having at least one queue therein, said queue having a threshold such that in the event that a segment arrives at said queue and said queue is filled above said threshold, a bit of said segment is set as said segment is passed out of said queue, said bit being set "marking" said segment as that segment having passed through a queue filled above said lower threshold level;
a second line card receiving said segments from said switching fabric, said second linecard translating said segments into a computer network packet for transmission by said second linecard out through a port connected to an output computer network;
a circuit determining whether or not a particular segment of said segments received by said second linecard has said bit set indicating that said segment is marked, and in response to detecting a segment as being marked, discarding said output packet in accordance with a random probability, and in response to detecting that no segment of said output packet is marked, transmitting said output packet onto said computer network;

said circuit counting a total number of segments received by said output linecard;

said circuit counting a number of said segments received by said linecard which are marked;

said circuit calculating a ratio R by dividing said number of marked segments by said total number of segments;

said circuit calculating a random number, said random number having a value between zero and a maximum value of said ratio R; and said circuit causing said packet to be discarded in the event that said ratio R is greater than said random number.

8. A method for operating a network device, comprising:
receiving computer network packets from an input computer network;
translating said packets into segments;
receiving said segments in a switching fabric, said switching fabric to route said segments to a desired output linecard, said switching fabric having at least one queue therein, said queue having a threshold such that in the event that a segment arrives at said queue and said queue is filled above said threshold, a bit of said segment is set as said segment is passed out of said queue, said bit being set "marking" said segment as that segment having passed through a queue filled above said threshold level;
receiving said segment from said switching fabric by an output linecard, said output linecard translating said segments into a computer network packet for transmission by said output linecard out through a port connected to an output computer network;
determining whether or not a particular segment of said segments received by said output linecard has said bit set indicating that said segment is marked;
discarding said output packet, in response to detecting a segment as being marked, in accordance with a random probability, and in response to detecting that no segment of said output packet is marked, transmitting said output packet onto said computer network.

9. The method for operating a network device of claim 8 further comprising:
detecting a priority class of at least a selected packet of said input computer network packets;
selecting, in response to said priority class, class specific values in calculating a probability for discarding an output packet corresponding to said selected input packet.

10. A method for operating a network device, comprising:
receiving computer network packets from an input computer network;
translating said packets into segments;
receiving said segments in a switching fabric, said switching fabric to route said segments to a desired output linecard, said switching fabric having at least one queue therein, said queue having a threshold such that in the event that a segment arrives at said queue and said queue is filled above said threshold, a bit of said segment is set as said segment is passed out of said queue, said bit being set "marking" said segment as that segment having passed through a queue filled above said threshold level;

receiving said segment from said switching fabric by an output linecard, said output linecard translating said segments into a computer network packet for transmission by said output linecard out through a port connected to an output computer network;

determining whether or not a particular segment of said segments received by said output linecard has said bit set indicating that said segment is marked;

discarding said output packet, in response to detecting a segment as being marked, in accordance with a random probability, and in response to detecting that no segment of said output packet is marked, transmitting said output packet onto said computer network;

counting a total number of segments received by said output linecard;

counting a number of said segments received by said linecard which are marked;

calculating a ratio R by dividing said number of marked segments by said total number of segments, the value of ratio R having a maximum value;

calculating a random number, said random number having a value between zero and said maximum value of ratio R; and causing said packet to be discarded in the event that said ratio R is greater than said random number.

11. A computer readable medium containing instructions for performing the method of, receiving computer network packets from an input computer network;

translating said packets into segments;

receiving said segments in a switching fabric, said switching fabric to route said segments to a desired output linecard, said switching fabric having at least one queue therein, said queue having a threshold such that in the event that a segment arrives at said queue and said queue is filled above said threshold, a bit of said segment is set as said segment is passed out of said queue, said bit being set "marking" said segment as that segment having passed through a queue filled above said threshold level;

receiving said segment from said switching fabric by an output linecard, said output linecard translating said segments into a computer network packet for transmission by said output linecard out through a port connected to an output computer network;

determining whether or not a particular segment of said segments received by said output linecard has said bit set indicating that said segment is marked;

discarding said output packet, in response to detecting a segment as being marked, in accordance with a random probability, and in response to detecting that no segment of said output packet is marked, transmitting said output packet onto said computer network.

12. A method for use in a network device, the method comprising the steps of:

receiving an input packet at an input linecard;

translating the input packet into segments;

forwarding the segments to a switching fabric, the switching fabric having at least one queue;

setting a bit in a particular segment as "marked" in the event the particular segment passes through a queue filled above a threshold;

forwarding the segments to an appropriate output linecard;

translating the segments into an output packet; and discarding the output packet, in accordance with a random probability, in the event a particular segment of the output packet is marked.

13. The method as in claim 12, further comprising: transmitting the output packet in the event that no segment of the output packet is marked.

14. The method as in claim 12, further comprising:

counting a total number of segments received by the output linecard;

counting a number of the segments received by the output linecard that are marked;

calculating a ratio R by dividing the number of marked segments by the total number of segments, the value of ratio R having a maximum value;

calculating a random number, the random number having a value between zero and the maximum value of ratio R; and causing the packet to be discarded in the event that the ratio R is greater than the random number.

15. The method as in claim 12, further comprising:

detecting a priority class of the input packet; and selecting, in response to the priority class, class specific values in calculating a probability for discarding an output packet corresponding to the input packet.

16. A network device, comprising:

an input linecard to receive an input packet, translate the input packet into segments, and forward the segments;

a switching fabric to receive the segments, the switching fabric having at least one queue, the switching fabric to set a bit in a particular segment as "marked" in the event the particular segment passes through a queue filled above a threshold, and to forward the segments;

an output linecard to receive the appropriate segments, translate the segments into an output packet, and discard the output packet, in accordance with a random probability, in the event a particular segment of the output packet is marked.

17. The network device as in claim 16, further comprising: the output linecard to transmit the output packet in the event that no segment of the output packet is marked.

18. The network device as in claim 16, further comprising:

a circuit to,
  i) count a total number of segments received by the output linecard;
  ii) count a number of the segments received by the output linecard that are marked;
  iii) calculate a ratio R by dividing the number of marked segments by the total number of segments, the value of ratio R having a maximum value;
  iv) calculate a random number, the random number having a value between zero and the maximum value of ratio R; and
  v) cause the packet to be discarded in the event that the ratio R is greater than the random number.

19. The network device as in claim 16, further comprising: logic to detect a priority class of the input packet, and select, in response to the priority class, class specific values in calculating a probability for discarding an output packet corresponding to the input packet.

20. A network device, comprising:

means for receiving an input packet at an input linecard;

means for translating the input packet into segments;

means for forwarding the segments to a switching fabric, the switching fabric having at least one queue;

means for setting a bit in a particular segment as "marked" in the event the particular segment passes through a queue filled above a threshold;

means for forwarding the segments to an appropriate output linecard;

means for translating the segments into an output packet; and means for discarding the output packet, in accordance with a random probability, in the event a particular segment of the output packet is marked.

21. A computer readable medium, comprising: the computer readable media containing instructions for execution on a processor for the practice of the method of, receiving an input packet at an input linecard;

translating the input packet into segments;

forwarding the segments to a switching fabric, the switching fabric having at least one queue;

setting a bit in a particular segment as "marked" in the event the particular segment passes through a queue filled above a threshold;

forwarding the segments to an appropriate output linecard;

translating the segments into an output packet; and discarding the output packet, in accordance with a random probability, in the event a particular segment of the output packet is marked.

* * * * *